US008958977B2

(12) United States Patent
Yanagawa et al.

(10) Patent No.: US 8,958,977 B2
(45) Date of Patent: Feb. 17, 2015

(54) VEHICLE PERIMETER MONITOR

(75) Inventors: Hirohiko Yanagawa, Chiryu (JP); Hideki Ootsuka, Anjo (JP); Masayuki Imanishi, Okazaki (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 149 days.

(21) Appl. No.: 13/150,454

(22) Filed: Jun. 1, 2011

(65) Prior Publication Data

US 2011/0301846 A1 Dec. 8, 2011

(30) Foreign Application Priority Data

Jun. 3, 2010 (JP) ................................ 2010-128181

(51) Int. Cl.
*G06F 19/00* (2011.01)
*G08G 1/16* (2006.01)

(52) U.S. Cl.
CPC ........................................ *G08G 1/16* (2013.01)
USPC .......................................................... 701/301

(58) Field of Classification Search
USPC .......................................................... 701/301
See application file for complete search history.

(56) References Cited

U.S. PATENT DOCUMENTS

| | | | | |
|---|---|---|---|---|
| 6,449,383 | B1 * | 9/2002 | Oike et al. | 382/104 |
| 6,591,000 | B1 * | 7/2003 | Oike et al. | 382/104 |
| 6,633,669 | B1 * | 10/2003 | Atkinson | 382/174 |
| 6,714,675 | B1 * | 3/2004 | Atkinson | 382/174 |
| 7,215,894 | B2 * | 5/2007 | Kobayashi et al. | 398/195 |
| 7,647,180 | B2 * | 1/2010 | Breed | 701/301 |
| 7,672,507 | B2 * | 3/2010 | Fan | 382/164 |
| 7,965,866 | B2 * | 6/2011 | Wang et al. | 382/103 |
| 8,350,724 | B2 * | 1/2013 | Szczerba et al. | 340/932.2 |
| 8,427,574 | B2 * | 4/2013 | Honjo et al. | 348/360 |
| 2002/0095255 | A1 * | 7/2002 | Minowa et al. | 701/96 |
| 2002/0110262 | A1 * | 8/2002 | Iida et al. | 382/104 |
| 2005/0083405 | A1 | 4/2005 | Imoto et al. | |
| 2005/0169531 | A1 * | 8/2005 | Fan | 382/199 |
| 2006/0115124 | A1 | 6/2006 | Nobori et al. | |
| 2006/0206243 | A1 * | 9/2006 | Pawlicki et al. | 701/1 |
| 2007/0110331 | A1 | 5/2007 | Satoh | |

(Continued)

FOREIGN PATENT DOCUMENTS

| | | | | |
|---|---|---|---|---|
| JP | 01031294 A * | 2/1989 | | G08B 19/00 |
| JP | A-02-166598 | 6/1990 | | |

(Continued)

OTHER PUBLICATIONS

Office Action mailed Jun. 13, 2012 issued in corresponding JP application No. 2010-128181 (English translation attached).

(Continued)

*Primary Examiner* — John R Olszewski
*Assistant Examiner* — Jean-Paul Cass
(74) *Attorney, Agent, or Firm* — Posz Law Group, PLC

(57) ABSTRACT

A vehicle perimeter monitor includes: a shooting device mounted on a vehicle for shooting an image of an outside of the vehicle; a controller including a detector and a generator, wherein the detector sets a detection line in a shot image, and detects a change amount of brightness of a picture cell on the detection line so that the detector detects movement of a moving object along with the detection line, and wherein the generator generates information display according to a detection result of the moving object; and a display for displaying the shot image and the information display.

20 Claims, 6 Drawing Sheets

(56) References Cited

U.S. PATENT DOCUMENTS

| | | | | |
|---|---|---|---|---|
| 2007/0253597 | A1* | 11/2007 | Utida et al. | 382/104 |
| 2008/0300055 | A1* | 12/2008 | Lutnick et al. | 463/39 |
| 2009/0067677 | A1 | 3/2009 | Nobori et al. | |
| 2009/0143967 | A1* | 6/2009 | Lee et al. | 701/119 |
| 2009/0263023 | A1* | 10/2009 | Iwamoto | 382/199 |
| 2010/0141764 | A1 | 6/2010 | Nobori et al. | |
| 2010/0245574 | A1 | 9/2010 | Imanishi et al. | |
| 2010/0253688 | A1* | 10/2010 | Cui et al. | 345/443 |
| 2011/0021271 | A1* | 1/2011 | Ikeda et al. | 463/30 |
| 2011/0106380 | A1* | 5/2011 | Wang et al. | 701/36 |
| 2011/0169866 | A1* | 7/2011 | Yoshikawa et al. | 345/660 |
| 2011/0246604 | A1* | 10/2011 | Imanishi | 709/217 |
| 2011/0273310 | A1* | 11/2011 | Kadowaki et al. | 340/932.2 |
| 2011/0306024 | A1* | 12/2011 | Furuta et al. | 434/258 |
| 2012/0309261 | A1* | 12/2012 | Boman et al. | 446/268 |

FOREIGN PATENT DOCUMENTS

| | | | | |
|---|---|---|---|---|
| JP | A-11-14348 | | 1/1999 | |
| JP | 2004056486 | A * | 2/2004 | H04N 7/18 |
| JP | A-2004-56486 | | 2/2004 | |
| JP | A-2005-123968 | | 5/2005 | |
| JP | 2008308011 | A * | 12/2008 | |
| JP | A-2008-308011 | | 12/2008 | |
| JP | 2009038779 | A * | 2/2009 | |
| JP | A-2009-38779 | | 2/2009 | |

OTHER PUBLICATIONS

Preliminary Search Report dated Jun. 13, 2012 in corresponding FR Application No. 1160244 (and English translation).

* cited by examiner

VEHICLE PERIMETER MONITOR

CROSS REFERENCE TO RELATED APPLICATION

This application is based on Japanese Patent Application No. 2010-128181 filed on Jun. 3, 2010, the disclosure of which is incorporated herein by reference.

TECHNICAL FIELD

The present invention relates to a vehicle perimeter monitor for monitoring a moving object on a perimeter of the vehicle.

BACKGROUND

A vehicle perimeter monitor displays an image shot by a camera in order to improve an eyesight of a driver of the vehicle. In JP-A-2005-110202 corresponding to US 2005/0083405, the vehicle perimeter monitor includes a camera device having a wide lens, of which a field angle is equal to or larger than 180 degrees. Although the camera device can shoots an image in a wide sight range, as shown in FIG. 3, an object on a periphery of the image has a twist image, which is comparatively small. Specifically, when the driver backs the vehicle, it is necessary for the driver to pay attention to a clearance between the vehicle and an adjacent vehicle, which is parked next to the vehicle. Thus, the driver may not recognize the object, which is displayed small on the display screen.

Accordingly, for example, JP-A-2005-123968 teaches a monitor such that the monitor retrieves an image of a moving object from a shot image, and emphasizes and displays the image of the moving object. The monitor calculates an optical flow of a characteristic point of the shot image so that a moving vector of each characteristic point is obtained. Thus, the monitor can retrieve the image of the moving object. When the retrieved image of the moving object is emphasized and displayed, the driver of the vehicle can recognize easily that the moving object exists at a blind area in front of the vehicle.

However, an image processing for retrieving the moving vector with using the optical flow needs a huge amount of calculation. Accordingly, it is necessary to add a dedicated processor for reducing a process time when the image of the moving object is retrieved with high accuracy with following the movement of the moving object.

SUMMARY

In view of the above-described problem, it is an object of the present disclosure to provide a vehicle perimeter monitor for monitoring a moving object on a perimeter of the vehicle. The vehicle perimeter monitor detects an image of a moving object in a shot image, and informs a driver of a vehicle of existence of the moving object.

According to an aspect of the present disclosure, a vehicle perimeter monitor includes: a shooting device mounted on a vehicle for shooting an image of an outside of the vehicle; a controller including a detector and a generator, wherein the detector sets a detection line in a shot image, and detects a change amount of brightness of a picture cell on the detection line so that the detector detects movement of a moving object along with the detection line, and wherein the generator generates information display according to a detection result of the moving object; and a display for displaying the shot image and the information display.

In the above monitor, when the change amount of brightness of the picture cell on the detection line caused by the movement of the moving object is detected, the moving object is detected with a comparatively small amount of calculation. Since the display displays the shot image and the information display, which is generated by the generator, a driver of the vehicle easily recognizes the moving object.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION (First Embodiment)

Figure 1:
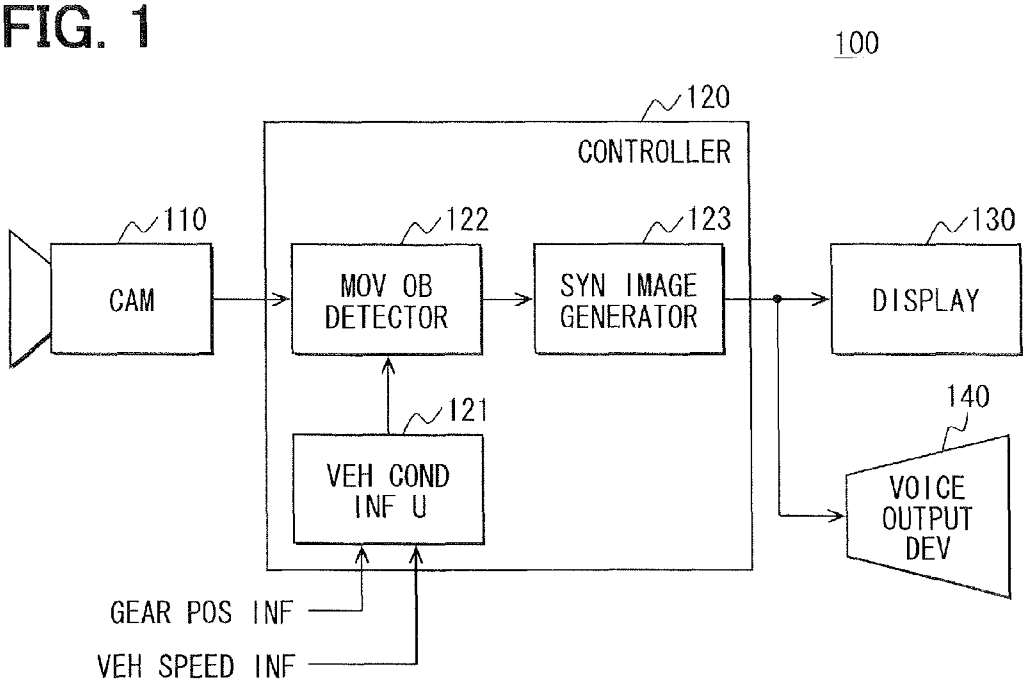
FIG. 1 is a diagram showing a vehicle perimeter monitor according to a first embodiment.
Figure 2:
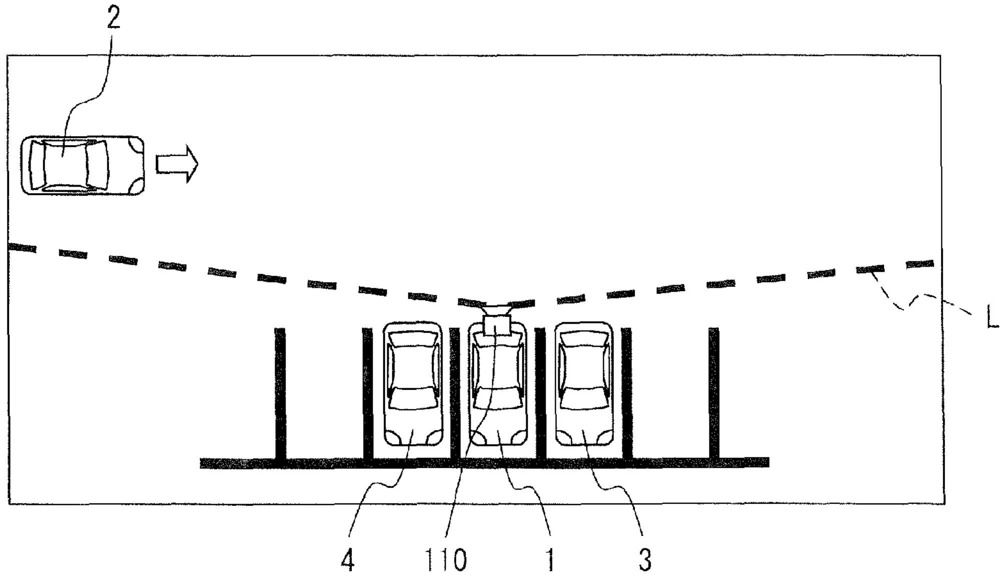
FIG. 2 is a diagram showing a situation such that a vehicle backs in a parking lot.

FIG. 1 shows a vehicle perimeter monitor 100 according to a first embodiment. A camera 110 in the monitor 100 includes a wide lens having a curved lens surface. As shown in FIG. 2, the camera 110 is arranged on a rear end of the vehicle. The camera 110 shoots a rear view image in an angle range of 180 degrees. FIG. 2 shows a situation such that a vehicle 1 having the monitor 100 backs in a parking lot. Specifically, in FIG. 2, the vehicle 1 goes forward and is parked between a right side adjacent vehicle 4 and a left side adjacent vehicle 3. Then, the vehicle 1 starts to back. A running vehicle 2 approaches the vehicle 1 from a right side and a rear side of the driver of the vehicle 1. The camera 110 in the vehicle 1 shoots an image in an angle range of 180 degrees, which is shown as a dotted line L and disposed on a rear side of the vehicle.

A controller 120 in the monitor 100 includes a CPU (not shown), a ROM as a memory medium for storing a program and the like, which provides various functions, a RAM for storing data temporally as a working area, and a bus that couples among the CPU, the ROM and the RAM. When the CPU executes a program o the ROM, various functions are realized.

A controller 120 in the monitor 100 includes a vehicle condition information obtaining unit 121 corresponding to a speed information obtaining element and a gear position information obtaining element, a moving object detector 122 corresponding to a detection element, and a synthetic image generator 123 corresponding to a generation element. The vehicle condition information unit 121 obtains vehicle condition information such as a position of a gear and a vehicle speed from various sensors in the vehicle. Then, the unit 121 outputs the information to the moving object detector 122. The detector 122 detects the moving object based on the shot image output from the camera 110. The detector 122 outputs a detection result and the shot image to the synthetic image generator 123. Further, the detector 122 starts to detect the moving object and stops detecting the moving object according to the information of the position of the gear and the vehicle speed. The synthetic image generator 123 synthesizes the shot image based on the detection result of the moving object so as to display information for informing the driver of the moving object. Then, the synthetic image generator 123 outputs synthesized shot image with the information to the display 130. Alternatively, the generator 123 may control a voice output device 140 to output a warning sound.

Figure 3:
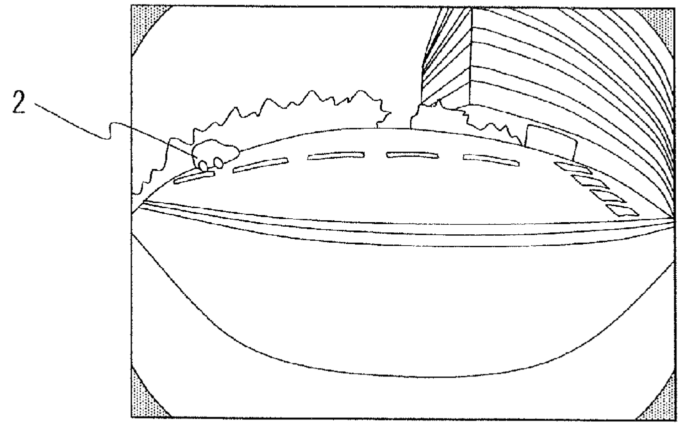
FIG. 3 PRIOR ART
FIG. 3 is a diagram showing a rear view image of a display device.

The display 130 is, for example, a liquid crystal display, an organic EL display, a plasma display or the like. The display 130 is arranged at a position of a compartment of the vehicle so that the driver easily looks at the display 130. The display 130 displays the image output from the controller 120. FIG. 3 shows a rear view image displayed on the display 130. In view of a property of the wide lens, the object disposed on a periphery of the image is shot to be smaller. For example, the image of the running vehicle 2 is smaller than an actual image. Here, the rear view image shot by the camera 110 is reversed in a right-left direction, and then, the reversed rear view image is displayed on the display 130.

The voice output device 140 is, for example, a speaker and the like. Based on the instruction from the controller 120, the voice output device 140 outputs a warning sound and a voice message.

Figure 4:
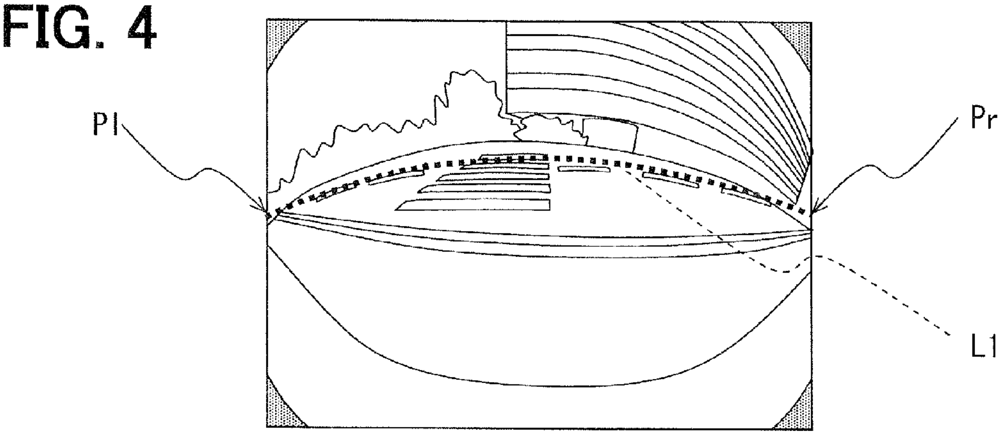
FIG. 4 is a diagram showing a region of a shot image, in which a moving object is detected.

Next, the detection process of the moving object executed in the moving object detector 122 will be explained with reference to FIGS. 4 to 6.

The moving object detector 122 determines a region of the shot image in which the moving object is to be detected. FIG. 4 shows the region in which the moving object is to be detected. A detection line L1 connecting between two points Pl, Pr provides the region in which the moving object is to be detected. The detection line L1 is a dotted line. Here, two points Pl, Pr may be determined at any points according to the region, which is required for detection. In the present embodiment, the right side point Pr is determined to be a point at infinity (i.e., a varnishing point) on the right side of the image. The left side point Pl is determined to be a point at infinity on the left side of the image. The points Pr, Pl at infinity may be calculated according to the height and an angle of the camera 110 arranged on a body of the vehicle, a field angle of the lens of the camera 110 and a distortion factor of the lens of the camera 110. Specifically, the points Pr, Pl at infinity may be a designing matter. In general, a point at infinity may be detected by an optical flow. In the present embodiment, the points Pr, Pl at infinity are preliminary determined. Alternatively, the points Pr, Pl at infinity may be displaced by a predetermined distance in a vertical direction. Further, when the lens field angle is smaller than 180 degrees, virtual points Pr, Pl at infinity may be determined at an outside of the shot image.

Thus, two points Pr, Pl at infinity are connected to each other with a line according to the distortion factor of the lens so that the detection line L1 is determined. Specifically, as shown in FIG. 4, the detection line L1 is determined to adjust the distortion factor of the lens so that, when the detection line L1 is projected on an actual road, the projected line provides a straight line. The detection line L1 is one line in FIG. 4. Alternatively, the detection line L1 may have a predetermined width so that the region, in which the moving object is to be detected, has the predetermined width. After the detection line L1 is determined, the image may be corrected so as to reduce the distortion of the shot image.

Figure 5A:
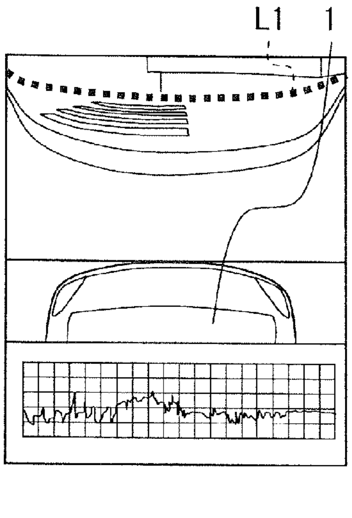
FIGS. 5A to 5C are diagrams showing a rear view image of the moving object in a daytime and a graph of brightness of a picture cell on a detection line.
Figure 5B:
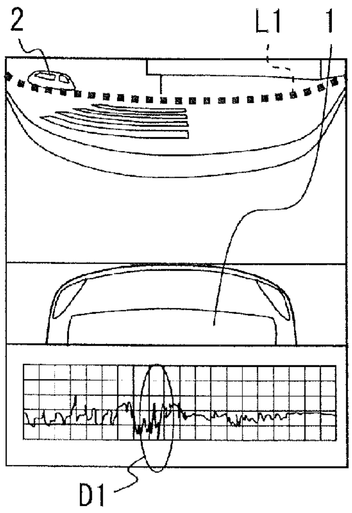
Figure 5C:
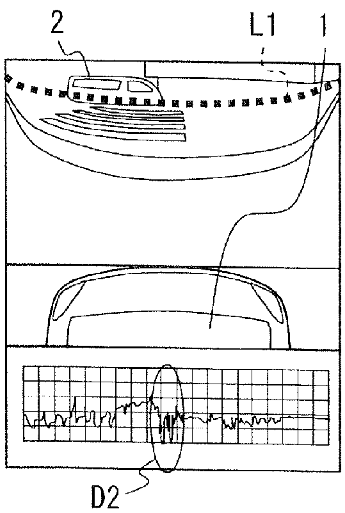

The moving object detector 122 monitors brightness of a picture cell on the detection line L1 in the shot image. FIGS. 5A to 5C show rear view images when the running vehicle 2 approaches the vehicle 1 as a subject vehicle and a graphs of brightness of the picture cell on the detection line L1. The rear view image is reversed in the right-left direction so as to display on the display 130. Further, in order to reduce the distortion of the shot image, the distortion of the image including the detection line L1 is corrected. Here, the image of the vehicle 1 is attached to the shot rear view image in order to show a relationship between the rear view image and the vehicle 1.

A horizontal axis of the graph represents a distance on the detection line L1 from the vehicle 1. A unit of the distance is meter. Specifically, the center of the image, i.e., a position of the vehicle 1 is defined as an original point O. The distance on the right direction is defined as positive, and the distance on the left direction is defined as negative. A unit scale of the horizontal axis is five meters. The maximum distance in the right direction is 50 meters, and the maximum distance on the left direction is 50 meters. The distance corresponds to an actual distance on the detection line L1. The distance is calculated based on the lens field angle and the lens distortion factor of the camera 110. When the distortion of the image is corrected, the distance is also corrected according to the distortion correction. Thus, the position of the picture cell on the detection line L1 is associated with a linear distance in a case where the detection line L1 is projected on the actual road. Here, alternatively, a specific point on the detection line L1 from the original point O may be converted to the linear distance in real space without association between the position of the picture cell on the detection line L1 and the linear distance in the real space.

The vertical axis of the graph represents the brightness of the picture cell. Specifically, the brightness is shown as a brightness level in a range between 0 and 255, which is provided by 8-bit tone.

FIG. 5A shows the brightness in a case where there is no running vehicle 2 around the vehicle 1. FIGS. 5B and 5C show the brightness in a case where the running vehicle 2 approaches the subject vehicle 1. FIG. 5C shows an image shot one second later from the image in FIG. 5B has been shot. Thus, the brightness is largely changed according to the position of the running vehicle 2. Specifically, in FIG. 5B, the brightness is largely reduced at the distance of minus seven meters, which is shown as an ellipse D1. The brightness level is reduced by 100 points at the ellipse D1. In FIG. 5C, the brightness is largely reduced at the distance of minus two meters, which is shown as an ellipse D2. The brightness level is reduced by 100 points at the ellipse D2. In an example case in a daytime shown in FIGS. 5A to 5C, when a tire of the running vehicle 2 crosses the detection line L1, the brightness is largely reduced. However, the brightness may be increased in some cases where the image includes a certain background on the detection line L1 and/or a certain portion of the running vehicle 2 crosses the detection line L1. Accordingly, even when the shot image is shot in the daytime, not only the reduction of the brightness and but also the increase of the brightness are monitored.

Figure 6A:
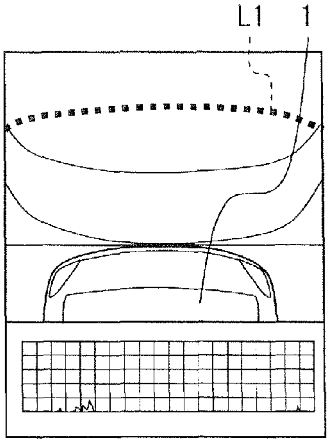
FIGS. 6A to 6C are diagrams showing a rear view image of the moving object in a nighttime and a graph of brightness of a picture cell on a detection line.
Figure 6B:
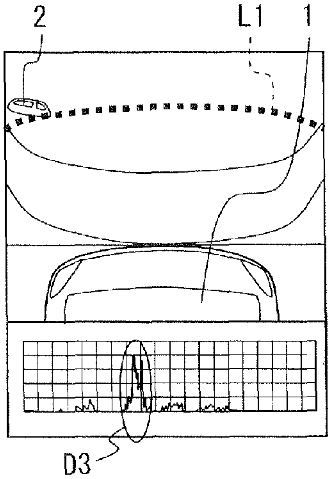
Figure 6C:
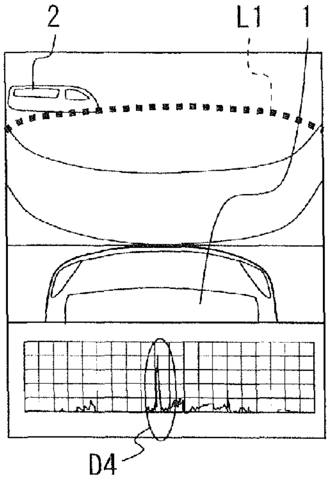

FIGS. 6A to 6C show rear view images shot in a nighttime and graphs showing a change of brightness of the picture cell on the detection line L1. FIG. 6A shows the brightness in a case where there is no running vehicle 2 around the vehicle 1. FIGS. 6B and 6C show the brightness in a case where the running vehicle 2 approaches the subject vehicle 1. FIG. 6C shows an image shot one second later from the image in FIG. 6B has been shot. In case of nighttime, the brightness is largely changed at the position of the running vehicle 2 because of a head light of the running vehicle 2. Specifically, in FIG. 6B, the brightness is largely increased at the distance of minus ten meters, which is shown as an ellipse D3. The brightness level is increased by 200 points at the ellipse D3. In FIG. 6C, the brightness is largely increased at the distance of minus five meters, which is shown as an ellipse D4. The brightness level is increased by 200 points at the ellipse D4.

The moving object detector 122 determines that the moving object is disposed at a position when the change of brightness at the position is equal to or larger than a predetermined threshold. Here, the change of brightness means the reduction or increase of brightness. Here, the threshold may be preliminary determined based on an experiment or the like. It is preferred that the threshold may be changed according to the brightness of the picture cell on the detection line L1 in the image, in which no moving object is disposed. For example, as shown in FIGS. 5A to 5C, when the brightness of the picture cell on the detection line L1, on which no moving object exists, is in a middle level among 256 tones, for example, when the brightness level is in a range between 100 points and 150 points, the threshold is set to be 100. For example, as shown in FIGS. 6A to 6C, when the brightness of the picture cell on the detection line L1, on which no moving object exists, is low, i.e., when the brightness is very dark (i.e., when the brightness level is in a range between 0 point and 50 points), the threshold is set to be 150. When the brightness of the picture cell on the detection line L1, on which no moving object exists, is high, i.e., when the brightness is very bright (i.e., when the brightness level is in a range between 200 points and 255 points), the threshold is set to be 150.

The moving object detector 122 calculates the moving direction and the moving speed of the moving object by monitoring the position of the moving object temporally. In FIGS. 5A to 5C, the running vehicle 2 is disposed at the distance of minus seven meters in FIG. 5B, and the running vehicle 2 moves to the distance of minus two meters one second later. Thus, the running vehicle 2 moves from the left side to the right side with the speed of 18 km/h. Similarly, in FIGS. 6A to 6C, the running vehicle 2 is disposed at the distance of minus ten meters in FIG. 6B, and the running vehicle 2 moves to the distance of minus five meters one second later. Thus, the running vehicle 2 moves from left side to the right side with the speed of 18 km/h. Here, when the change of brightness is equal to or larger than the threshold at multiple positions, the detector 122 may detect only the object, which approaches the vehicle 1 along with the moving direction and is disposed nearest from the vehicle 1, as the moving object.

The detector 122 outputs information about the position, the moving direction and the moving speed of the moving object in addition to the shot image as the detection result of the moving object to the synthetic image generator 123.

Figure 7:
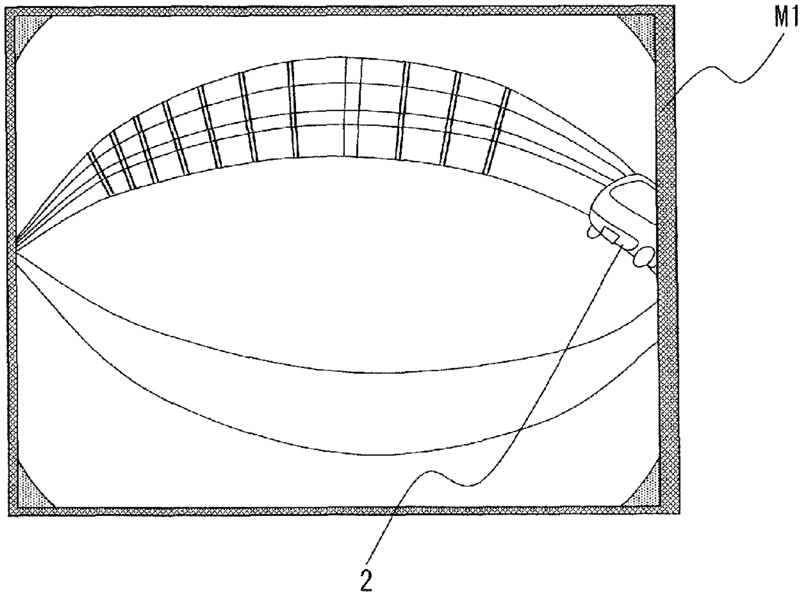
FIG. 7 is a diagram showing a synthetic image such that the moving object approaches from a right side.

Then, the synthesis process of the information display executed by the synthetic image generator 123 will be explained with reference to FIGS. 7 to 8. The generator 123 generates the synthesized image including the information display based on the shot image and the detection result from the detector 122. FIGS. 7 and 8 are examples of synthesized images.

The generator 123 synthesizes a marker M1 along with a left side or a right side of the shot image according to the moving direction of the moving object. FIG. 7 shows a synthesized image in a case where the running vehicle 2 moves from the right direction to the left direction. In order to alert the driver to the right direction, the marker M1 having red color is synthesized along with a right side frame of the screen. Here, the color of the marker M1 may be any such as yellow or orange as long as the marker M1 alerts the driver to the running vehicle 2 on the right side.

Figure 8A:
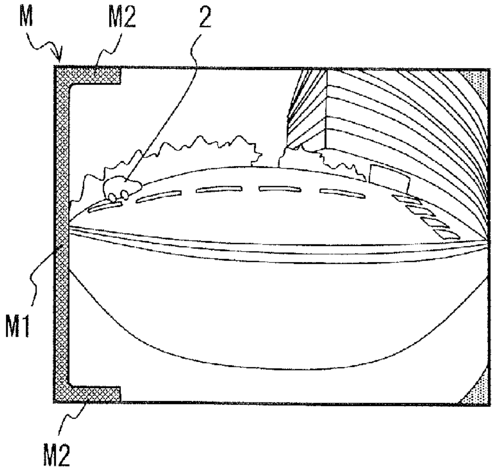
FIGS. 8A and 8B are diagrams showing a synthetic image such that the moving object approaches from a left side.
Figure 8B:
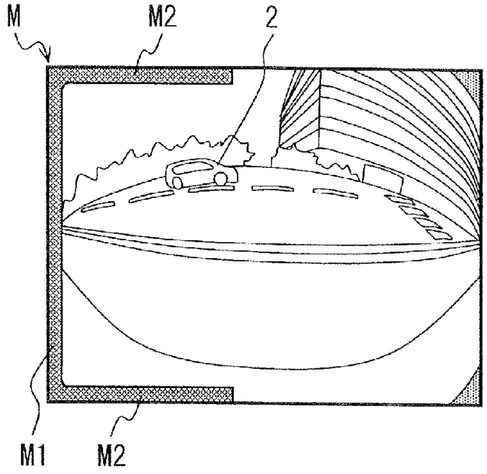

The generator 123 synthesizes the marker M2 along with a upper side or a bottom side of the shot image according to the position of the moving object. FIGS. 8A and 8B show synthesized images in a case where the running vehicle 2 moves from the left side to the right side. The red marker M2 is synthesized along with the upper side and the bottom side of the shot image from the lefts side of the shot image to a position facing the running vehicle 2. Specifically, the red marker M2 is arranged between the left edge of the screen (or a position adjacent to the left edge) and the upper or bottom position corresponding to the running vehicle 2 (or a position adjacent to the upper or bottom position). The marker M2 has a length of the upper side and the length of the bottom side, which becomes longer as the distance between the running vehicle 2 and the subject vehicle 1 is small, as shown in FIGS. 8A and 8B. When the marker M2 and the marker M1 are displayed at the same time, and the running vehicle 2 moves from the left side to the right side, the marker M provided by the marker m1 and the marker M2 has a C shape. On the other hand, when the running vehicle 2 moves from the right side to the left side, the marker M has a reversed C shape. Here, the marker M2 may be arranged on only one of the upper side and the bottom side.

Before the position of the running vehicle 2 moving from the left side to the right side exceeds zero, i.e., before the position of the running vehicle 2 passes near the position of the subject vehicle 1, the monitor 100 determines that the running vehicle 2 is the moving object approaching the vehicle 1, and therefore, it is necessary to alert the driver to the moving object. Thus, the monitor 100 continues to synthesize the marker M until the running vehicle 2 passes near the subject vehicle 1. After the position of the running vehicle 2 moving from the left side to the right side exceeds zero, i.e., after the position of the running vehicle 2 passes near the position of the subject vehicle 1, the monitor 100 determines that the running vehicle 2 is the moving object vanishing from the subject vehicle 1, and therefore, it is not necessary to alert the driver to the moving object. Thus, the monitor 100 stops synthesizing the marker M after the running vehicle 2 passes near the subject vehicle 1.

Here, the feature of the marker M may be changed according to the distance between the vehicle 1 and the running vehicle 2, i.e., the position of the running vehicle 2. For example, when the running vehicle 2 is disposed at a position far from the vehicle 1, the color of the marker m is yellow. As the running vehicle 2 approaches the vehicle 1, the color of the marker M is changed from yellow to red through orange. Here, orange and red have the impression of large warning degree, compared with yellow. Alternatively, when the moving object is far from the vehicle 1, the width of the marker M is thin. As the moving object approaches the vehicle 1, the width of the marker M becomes thick. Alternatively, when the moving object is far from the vehicle 1, the display 130 continues to display the marker M without blinking, or the display 130 displays the marker M with a long blinking period. As the moving object approaches the vehicle 1, the blinking period of the marker M becomes shorter.

Similarly, the feature of the marker M may be changed according to the moving speed of the running vehicle 2. For example, as the moving speed of the running vehicle 2 is high, the color of the marker M is changed from yellow to red through orange, i.e., the color of the marker M is changed to increase the impression of the warning degree. Alternatively, as the moving speed of the running vehicle 2 is high, the width of the marker M becomes thick. Alternatively, as the moving speed of the running vehicle 2 is high, the blinking period of the marker M becomes shorter. Here, the feature of the marker M1 may be the same as the feature of the marker M2. Alternatively, the feature of the marker M1 may be different from the feature of the marker M2. Instead of the marker M, or in addition to the marker M, the warning sound or the voice message may be generated in order to increase the warning impression to the moving object.

The synthesized image in the generator 123 is displayed on the display 130. The warning sound and the voice message are output from the voice output device 140. Here, when there is no moving object around the vehicle 1, the generator 123 does not synthesize the information display with respect to the shot image. The display 130 displays the shot image only.

Figure 9:
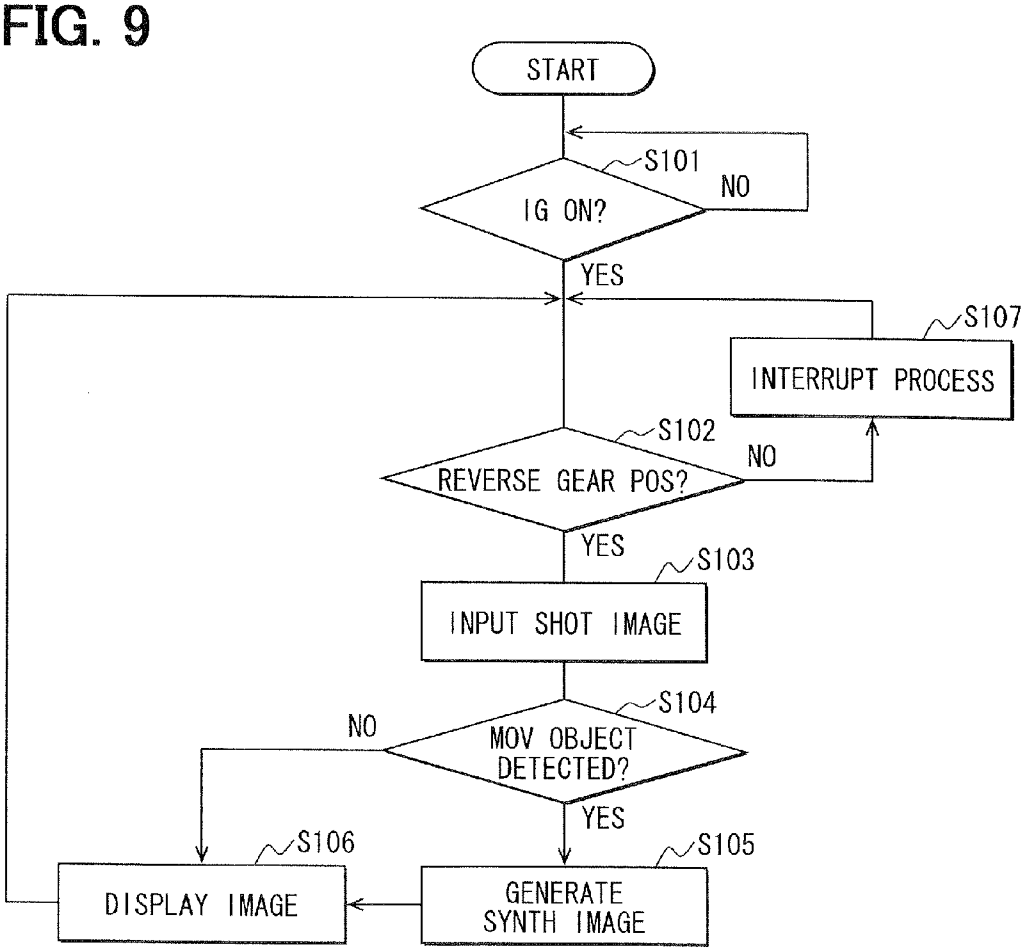
FIG. 9 is a flowchart showing a process in the vehicle perimeter monitor according to the first embodiment.

Next, the process of the monitor 100 will be explained with reference to FIG. 9. FIG. 9 shows the flowchart of the process in the monitor 100.

In step S101, when the ignition switch turns on, the monitor 100 is activated. Then, the vehicle condition information obtaining unit 121 in the controller 120 monitors the position of the gear.

Then, in step S102, when the monitor 100 detects that the position of the gear is changed to a back gear position (i.e., the position of the gear is changed to a reverse position), i.e., when the determination in step S102 is "YES," it goes to step S103. In step S103, the shot image is input from the camera into the controller 120.

In step S104, the detection process of the moving object is executed. When the moving object is detected, i.e., when the determination of step S104 is "YES," it goes to step S105. In step S105, the synthesizing process of the information display and the generating process of the warning sound and the voice message are executed. On the other hand, when the moving object is not detected, i.e., when the determination of step S104 is "NO," the synthesizing process of the information display is not executed. Then, the shot image is output to the display 130.

In step S106, the image output from the synthetic image generator 123 is displayed. Further, the voice output device 140 outputs the warning sound and/or the voice message. Steps S103 to S106 are repeated while the position of the gear is in the reverse gear position. When the position of the gear is changed to another position other than the reverse gear position, i.e., when the determination of step S102 is "NO," it goes to step S107. In step S107, the process is interrupted.

When the driver requests that the detection process of the moving object is executed only at a time when the vehicle starts to go reverse after the vehicle is parked, the controller 120 detects that the position of the gear is changed from the parking position to the reverse gear position after the ignition switch turns on. Alternatively, the controller 120 may detects that the position of the gear is changed to the reverse gear position while the vehicle speed is zero after the ignition switch turns on.

Thus, the detection line L1 connecting between two points Pr, Pl is defined, and the brightness of the picture cell on the detection line L1 is monitored. Thus, without using the optical flow, the moving object can be detected with a comparatively small calculation amount. Further, the markers M1, M2 as the information display are displayed. Thus, the monitor 100 alerts the driver to the moving object on the periphery of the screen image, which is shot and displayed to be smaller than an actual image. Specifically, when the vehicle starts to go reverse, and the driver has to pay attention to the clearance between the subject vehicle and an adjacent vehicle., it is difficult for the driver to always see the rear view image on the display 130. Thus, the image of the moving object disposed on the periphery of the screen image and displayed small may not be found by the driver. However, since the markers M1, M2 are displayed, the driver easily recognizes existence of the moving object even when the driver does not always look at the rear view image. Thus, the monitor alerts the driver to the moving object, and therefore, the safety of the driving is improved.

Further, since the drover can recognize the existence of the moving object moving along with any direction based on the display of the marker M, the driver pays attention to the direction instantaneously. In addition, the driver can recognizes the position of the moving object based on the display of the marker M2. Since the marker M2 is displayed to be longer as the moving object approaches the vehicle 1, the monitor 100 alerts the driver to the approach degree of the moving object. When the moving object approaches the vehicle 1, the marker M is synthesized. When the moving object moves away from the vehicle 1, the marker M is not synthesized. Thus, when the information is not comparatively significant for the driver, the information is not displayed.

Further, the display mode, i.e., display feature of the markers M1, M2 is changed in accordance with the position and the moving speed of the moving object. Thus, the monitor 100 provides the warning degree with respect to the moving object, so that the monitor 100 alerts the driver visually. Alternatively, the monitor 100 outputs the warning sound and the voice message, so that the monitor 100 alerts the driver aurally.

In the present embodiment, the synthesizing process of the marker M as the information display is executed. Alternatively, the synthesizing process may not be executed, but the information is displayed. For example, the color of the picture cell in the shot image may be changed. Alternatively, the color of the picture cell generated in the liquid crystal display may be changed. Thus, the information display is performed.

(First Modification)

As shown in the flowchart in FIG. 9, the position of the gear is monitored, and then, the monitor 100 starts or interrupts executing the detection of the moving object based on the information of the position of the gear. In the first modification, the vehicle speed of the subject vehicle 1 in addition to the position of the gear are monitored. The monitor 100 interrupts executing the detection of the moving object based on the information of the position of the gear in addition to the vehicle speed. This process is shown in FIG. 10.

Figure 10:
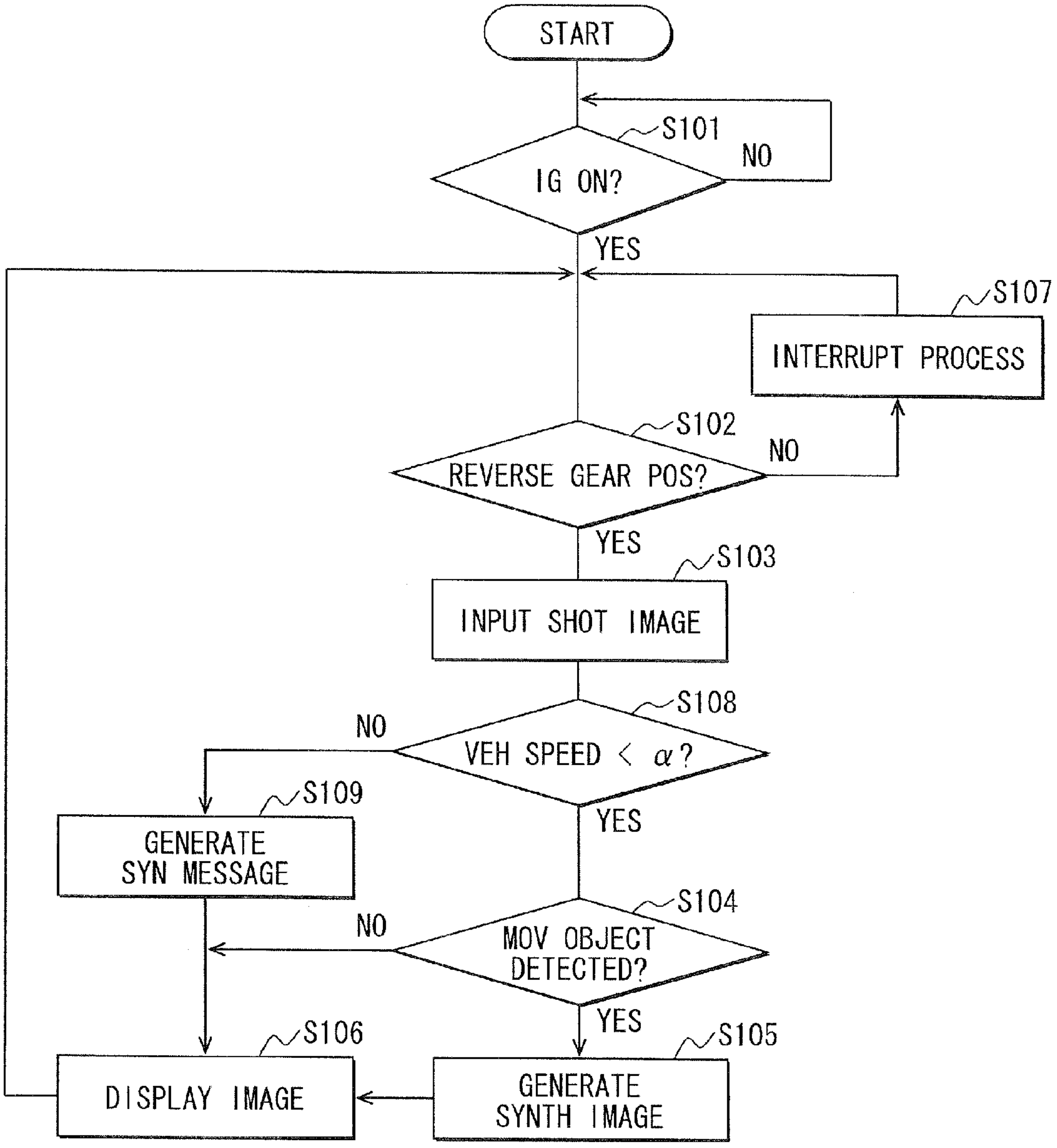
FIG. 10 is a flowchart showing a process in the vehicle perimeter monitor according to a first modification of the first embodiment.

FIG. 10 shows the flowchart of the process in the monitor 100 according to the first modification of the first embodiment.

In step S101, when the ignition switch turns on, the monitor 100 is activated so that the monitor 100 monitors the position of the gear and the vehicle speed of the vehicle 1. In step S108, when the vehicle speed is smaller than a predetermined speed α, i.e., when the determination of step S108 is "YES," the above described detection process is executed. When the vehicle speed is equal to or larger than the predetermined speed α, i.e., when the determination of step S108 is "NO," the detection process of the moving object is interrupted, and then, it goes to step S109.

In step S109, a synthesized message is generated. The synthesized message represents that the moving object detection process is interrupted. For example, the message "the detection stops since the speed is high" is synthesized over the shot image. Then, the synthesized shot image with the message is displayed on the display screen of the display 130 for a predetermined time interval in step S106.

In the moving body detection process, when the change amount of brightness of the picture cell on the detection line L1 is equal to or larger than the predetermined threshold, the controller 120 determines that the moving object exists. However, when the speed of the subject vehicle 1 is high, the changing amount of the background image in the shot image is also large. Thus, the changing amount of the background mage on the detection line L1 may be erroneously detected, so that the monitor 100 provides false detection of the existence of the moving object. Although the false detection depends on the pattern of the background image, as the vehicle speed of the vehicle 1 increases, the percentage of the false detection increases. Accordingly, in the first modification, when the vehicle speed of the vehicle 1 is equal to or larger than the predetermined threshold speed α,the monitor 100 interrupts the detection process of the moving object. The predetermined threshold speed a is preliminary determined based on the experiment or the like.

Thus, the false alert to the driver is restricted. Here, when the vehicle speed of the vehicle 1 is equal to or larger than the predetermined threshold speed α,the monitor 100 interrupts the detection process of the moving object. Alternatively, when the vehicle speed of the vehicle 1 is equal to or larger than the predetermined threshold speed α, the generator 123 may interrupt executing the synthesizing process of the information display.

(Second Modification)

In a second modification, the moving distance of the subject vehicle 1 is calculated, and the monitor 100 interrupts the detection of the moving object based on the moving distance of the subject vehicle 1.

The moving object detector 122 interrupts the detection process of the moving object when the moving distance of the subject vehicle 1 is equal to or larger than a predetermined threshold distance β. The synthesized message with reference to the interruption is not generated. Here, the predetermined threshold distance β may be set to be equal to the length of the vehicle 1. Specifically, when the vehicle is parked in the parking lot in FIG. 2, and the vehicle goes back by the distance equal to the length of the vehicle, the driver can recognize the moving object by the driver's eyes. Thus, in such a case, the detection process of the moving object is interrupted, and, when the information is not comparatively significant for the driver, the information is not displayed. Here, in the second modification, when the moving distance of the subject vehicle 1 is equal to or larger than the predetermined threshold distance β, the moving object detector 122 interrupts the detection process of the moving object. Alternatively, when the moving distance of the subject vehicle 1 is equal to or larger than the predetermined threshold distance β, the generator 123 may interrupt executing the synthesizing process of the information display.

(Third Modification)

In the first embodiment, when the vehicle 1 goes forward and is parked in the parking lot, the rear view image is displayed. In the third modification of the first embodiment, when the vehicle 1 goes forward and enters into an intersection with bad visibility, the monitor 100 displays the forward view image. The process in the third modification will be explained with reference to FIG. 11.

Figure 11:
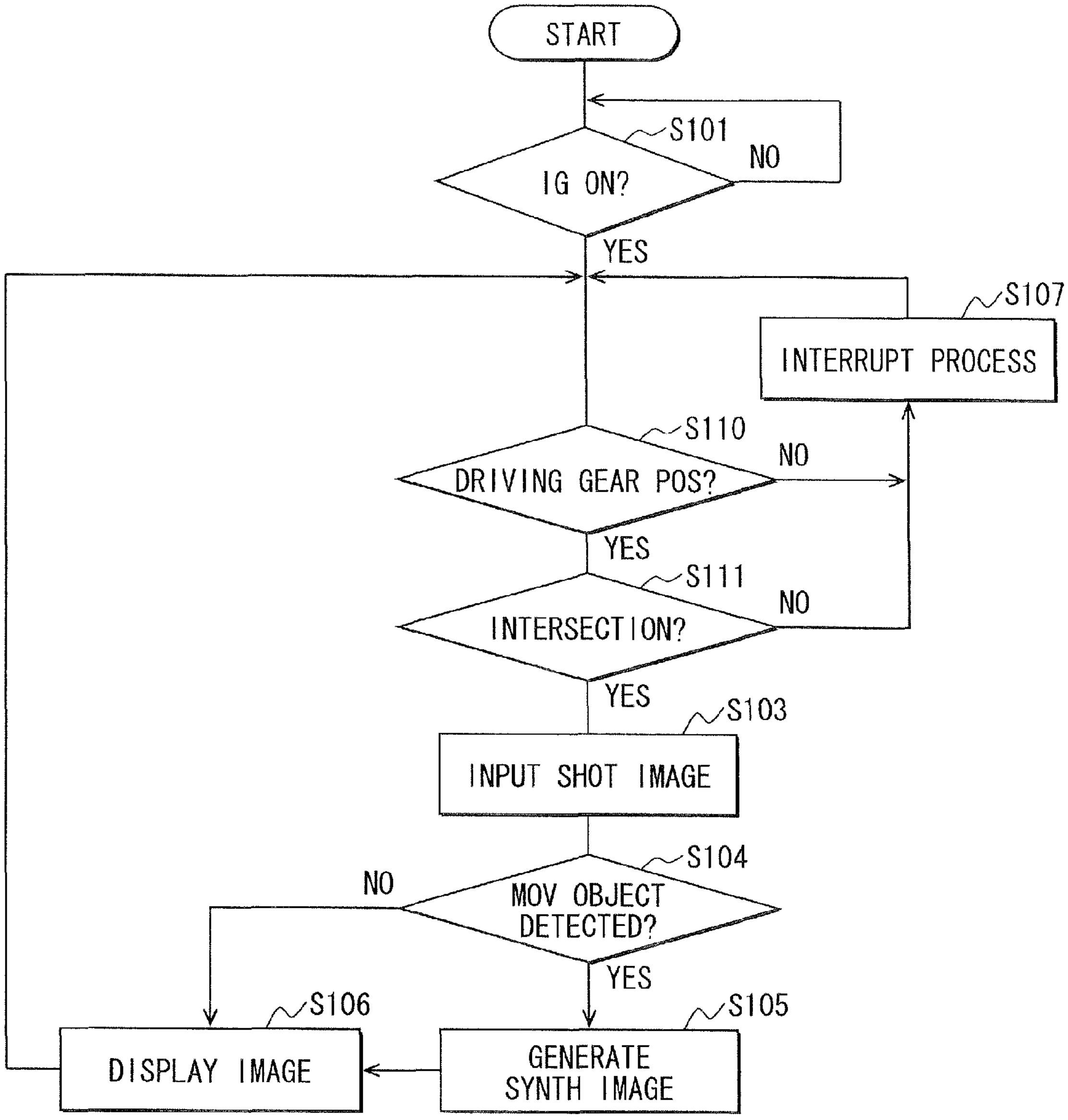
FIG. 11 is a flowchart showing a process in the vehicle perimeter monitor according to a third modification of the first embodiment.

FIG. 11 is a flowchart of the process in the monitor 100 according to the present modification.

In step S101, when the ignition switch turns on, the monitor 100 is activated so that the monitor 100 monitors the position of the gear and the vehicle speed of the vehicle 1.

In steps S110 and S111, when the position of the gear is a driving gear position (i.e., a forward gear position), and the vehicle 1 enters into the intersection, i.e., when the determinations of step S110 and S111 are "YES," steps S103 to S106 are performed. The monitor 100 may determines whether the vehicle 1 enters into the intersection based on the facts such that the speed of the vehicle 1 is reduced, and then, the vehicle temporally stops. Alternatively, the monitor 100 may determine whether the vehicle 1 enters into the intersection with bad visibility based on the information obtained from the navigation device (not shown). Alternatively, the vehicle may include a wireless communication device (not shown), and the monitor 100 may detect based on the information from a road side device via a road-to-vehicle communication method that the vehicle enters into the intersection. Here, in the third modification, the camera 110 is arranged on a front side of the vehicle 1, and the camera 110 shoots the front view image in an angle range of 180 degrees. Steps S103 to S106 in the third modification are the same as steps S103 to S106 in the first embodiment other than the difference between the front view image and the rear view image.

When the position of the gear is changed to another position other than the forward driving position, i.e., when the determination of step S110 is "NO," or when the vehicle is not disposed at the intersection, i.e., when the determination of step S111 is "NO," in step S107, the monitor 100 interrupts steps S103 to S106.

Thus, when the vehicle goes forward, and the vehicle enters into the intersection with bad visibility, the monitor 100 displays the forward view image. Without using the optical flow, the moving object can be detected with a comparatively small amount of calculation. Further, the markers M1, M2 as the information display are displayed on the screen. Thus, the monitor 100 alerts the driver to the moving object, so that safety is improved.

In the above embodiment, the moving object detection process is performed in the shot image having the left side point Pl at infinity and the right side point Pr at infinity. Alternatively, the moving object detection process may be performed in the shot image having the upper side point at infinity and the bottom side point at infinity. Further, the moving object may be a motor cycle, a bicycle or a pedestrian.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A vehicle perimeter monitor comprising:

an image capture device mounted on a vehicle for shooting an image of an outside of the vehicle;

a controller including a detector and a generator, wherein the detector sets a detection line in a shot image, and detects a change amount of brightness of a picture cell on the detection line so that the detector detects movement of a moving object along with the detection line, and wherein the generator generates information display according to a detection result of the moving object; and a display for displaying the shot image and the information display, wherein the detector detects that the moving object is disposed at a position of the picture cell when the change amount of brightness of the picture cell on the detection line is equal to or larger than a predetermined threshold, the detector monitors the position of the moving object temporally, and the detector detects a moving direction of the moving object based on a temporal change of the position, and the detector sets the detection line in accordance with a distortion of the shot image that is shot by the image capture device, the detector sets the detection line, which connects between a right side middle point and a left side middle point in the shot image, and the detection line is a distorted curved line.

2. The vehicle perimeter monitor according to claim 1, wherein the detector calculates an actual distance between the vehicle and the moving object.

3. The vehicle perimeter monitor according to claim 1, wherein the generator generates the information display in such a manner that a marker is arranged from an edge of the shot image to a point corresponding to the position of the moving object, and the marker is arranged along with a first side of the shot image.

4. The vehicle perimeter monitor according to claim 1, wherein the generator generates the information display in such a manner that a marker is arranged along with a second side of the shot image when the moving direction of the moving object directs from the second side to another side of the shot image.

5. The vehicle perimeter monitor according to claim 1, wherein the detector determines based on the position and the moving direction of the moving object whether the moving object approaches the vehicle, wherein the generator generates the information display when the detector determines that the moving object approaches the vehicle, and wherein the generator stops generating the information display when the detector determines that the moving object moves away from the vehicle.

6. The vehicle perimeter monitor according to claim 1, wherein the generator changes a feature of the information display in accordance with the position of the moving object or a distance between the vehicle and the moving object.

7. The vehicle perimeter monitor according to claim 1, wherein the detector monitors the position of the moving object temporally, wherein the detector detects a moving speed of the moving object based on a temporal change of the position, and wherein the generator changes a feature of the information display in accordance with the moving speed of the moving object.

8. The vehicle perimeter monitor according to claim 6, wherein the feature of the information display is at least one of a color, a width and a blinking interval of the information display.

9. The vehicle perimeter monitor according to claim 1, wherein the detector sets the detection line, which is connected between two points on the shot image.

10. The vehicle perimeter monitor according to claim 1, wherein the image capture device includes a wide lens.

11. The vehicle perimeter monitor according to claim 1, wherein the controller further includes a speed information detector for detecting information about a speed of the vehicle, and wherein the detector temporarily stops detecting the change amount of brightness of the picture cell on the detection line, or the generator temporarily stops generating the information display when the speed of the vehicle is equal to or larger than a predetermined speed.

12. The vehicle perimeter monitor according to claim 1, wherein the controller further includes a speed information detector for detecting information about a speed of the vehicle, wherein the controller calculates a moving distance of the vehicle based on the speed of the vehicle, wherein the detector temporarily stops detecting the change amount of brightness of the picture cell on the detection line, or the generator temporarily stops generating the information display when the moving distance of the vehicle is equal to or larger than a predetermined distance.

13. The vehicle perimeter monitor according to claim 1, wherein the image capture device shoots a rear view image of the vehicle, wherein the controller further includes a gear position detector for detecting information of a gear position of the vehicle, wherein the detector starts to detect the change amount of brightness of the picture cell on the detection line, and the generator generates the information display when the gear position of the vehicle is a reverse gear position.

14. The vehicle perimeter monitor according to claim 1, wherein the detection line is a single curved line.

15. The vehicle perimeter monitor according to claim 1, wherein the detection line is disposed along a distortion of the shot image.

16. The vehicle perimeter monitor according to claim 1, wherein the right side middle point is disposed at a center of a right side of the shot image, and the left side middle point is disposed at a center of a left side of the shot image.

17. A vehicular perimeter monitor controller connected to an image capture device mounted on a vehicle for shooting an image of an outside of the vehicle and a display device mounted on the vehicle for displaying a shot image and information display, the vehicle perimeter monitor controller comprising:

a detector for setting a detection line in a shot image, and detects a change amount of brightness of a plurality of picture cells disposed along the detection line; and a generator for generating the display information, wherein:

the detector detects a moving object moving along the detection line, based on a historical relationship of positions of picture cells, of which the change amount of brightness is equal to or larger than a predetermined threshold;

the detector monitors a position of the moving object temporally;

the detector further detects a moving direction of the moving object based on a temporal movement of the moving object;

the detection line is a distorted curved line in accordance with a distortion of the shot image that is shot by the image capture device; and the detection line connects a right side middle point of the shot image and a left side middle point of the shot image.

18. The vehicle perimeter monitor according to claim 17, wherein the detection line is a single curved line.

19. The vehicle perimeter monitor according to claim 17, wherein the detection line is disposed along a distortion of the shot image.

20. The vehicle perimeter monitor according to claim 17, wherein the right side middle point is disposed at a center of a right side of the shot image, and the left side middle point is disposed at a center of a left side of the shot image.

* * * * *